(12) United States Patent
Mossau et al.

(10) Patent No.: US 10,094,923 B2
(45) Date of Patent: Oct. 9, 2018

(54) MOTOR VEHICLE HAVING OCCLUSION DETECTION FOR ULTRASONIC SENSORS

(71) Applicant: VOLKSWAGEN AG, Wolfsburg (DE)

(72) Inventors: Daniel Mossau, Wolfsburg (DE); Peter Baumann, Braunschweig (DE); Heinecke Carsten, Klötze (DE); Manuel Tanner, Dresden (DE); Knut Sanny, Vordorf (DE)

(73) Assignee: VOLKSWAGEN AG, Wolfsburg (DE)

( * ) Notice: Subject to any disclaimer, the term of this patent is extended or adjusted under 35 U.S.C. 154(b) by 238 days.

(21) Appl. No.: 15/036,344

(22) PCT Filed: Oct. 30, 2014

(86) PCT No.: PCT/EP2014/073374
§ 371 (c)(1),
(2) Date: May 12, 2016

(87) PCT Pub. No.: WO2015/071110
PCT Pub. Date: May 21, 2015

(65) Prior Publication Data
US 2016/0291153 A1   Oct. 6, 2016

(30) Foreign Application Priority Data

Nov. 14, 2013   (DE) .................. 10 2013 223 240

(51) Int. Cl.
*G01S 7/52*   (2006.01)
*G01S 15/88*   (2006.01)
(Continued)

(52) U.S. Cl.
CPC ........ *G01S 15/878* (2013.01); *G01S 7/52004* (2013.01); *G01S 7/56* (2013.01);
(Continued)

(58) Field of Classification Search
CPC .. G01S 15/878; G01S 15/931; G01S 7/52004; G01S 7/56; G01S 2007/52009; G01S 2015/932; G01S 2015/938
See application file for complete search history.

(56) References Cited

U.S. PATENT DOCUMENTS 3,781,566 A    12/1973   Meuller
4,679,160 A *   7/1987   Whitener ................ G01W 1/14
                                                                                                     340/621
(Continued)

FOREIGN PATENT DOCUMENTS

CN        101147083 A     3/2008
CN        101500841 A     8/2009
(Continued)

OTHER PUBLICATIONS

International Search Report, dated Jan. 26, 2015, issued in corresponding International Application No. PCT/EP2014/073374.
(Continued)

*Primary Examiner* — Daniel Pihulic
(74) *Attorney, Agent, or Firm* — Hunton Andrews Kurth LLP

(57) ABSTRACT

In a method for checking a first ultrasonic sensor of a motor vehicle for an occlusion, a measuring signal of the first ultrasonic sensor is acquired by an evaluation unit, and from the measuring signal, a decay time of a natural oscillation of the diaphragm of the first ultrasonic sensor, brought about by an excitation pulse, is ascertained. From the measuring signal of either the first ultrasonic sensor or a second ultrasonic sensor, an echo produced by an object located in a sensing range of the first ultrasonic sensor is ascertained, and a distance value of the object is determined on the basis of the echo. An occlusion is signaled if the decay time is less than a predetermined threshold value which would be
(Continued)

exceeded if ice and/or dirt were to adhere directly to the diaphragm, and if the distance value is less than a predetermined maximum value.

9 Claims, 4 Drawing Sheets

(51) Int. Cl.
    *G01S 15/93*           (2006.01)
    *G01S 15/87*           (2006.01)
    *G01S 7/56*            (2006.01)

(52) U.S. Cl.
    CPC ... *G01S 15/931* (2013.01); *G01S 2007/52009* (2013.01); *G01S 2015/932* (2013.01); *G01S 2015/938* (2013.01)

(56) References Cited

U.S. PATENT DOCUMENTS

| | | | |
|---|---|---|---|
| 5,844,471 | A | 12/1998 | Daniel |
| 6,431,001 | B1 | 8/2002 | Tsuzuki et al. |
| 6,492,902 | B2 | 12/2002 | Nishimoto et al. |
| 6,765,491 | B1 | 7/2004 | Nass |
| 7,271,880 | B2 | 9/2007 | Samukawa et al. |
| 8,064,285 | B2 | 11/2011 | Preissler |
| 8,742,947 | B2 | 6/2014 | Nakazono et al. |
| 9,684,068 | B2 * | 6/2017 | Schumann ............ G01S 15/931 |
| 2002/0023498 | A1 * | 2/2002 | Tsuzuki ................. G01N 29/12 73/617 |
| 2009/0207006 | A1 | 8/2009 | Richter et al. |
| 2009/0210157 | A1 | 8/2009 | Lee |
| 2015/0260833 | A1 * | 9/2015 | Schumann ............ G01S 15/931 367/13 |
| 2016/0291153 | A1 * | 10/2016 | Mossau ................. G01S 15/931 |

FOREIGN PATENT DOCUMENTS

| | | |
|---|---|---|
| DE | 2 135 480 | 4/1972 |
| DE | 34 20 004 A1 | 12/1985 |
| DE | 199 24 755 | 11/2000 |
| DE | 101 42 075 | 5/2002 |
| DE | 10 2004 028 860 | 1/2005 |
| DE | 101 64 760 | 5/2006 |
| DE | 10 2005 057 973 | 6/2007 |
| DE | 10 2006 025 537 | 12/2007 |
| DE | 10 2007 026 033 | 12/2008 |
| DE | 10 2007 030 769 | 1/2009 |
| DE | 10 2009 040 992 | 3/2011 |
| DE | 10 2010 021 960 | 12/2011 |
| JP | 2002-071805 | 3/2002 |
| JP | 2003-248050 | 9/2003 |
| WO | WO 2009/119577 | 10/2009 |

OTHER PUBLICATIONS

International Preliminary Report on Patentability, dated May 17, 2016, in International Application No. PCT/EP2014/073374.

* cited by examiner

MOTOR VEHICLE HAVING OCCLUSION DETECTION FOR ULTRASONIC SENSORS

CROSS REFERENCE TO RELATED APPLICATIONS

The present application claims priority to Application No. 10 2013 223 240.3, filed in the Federal Republic of Germany on Nov. 14, 2013, which is expressly incorporated herein in its entirety by reference thereto.

FIELD OF THE INVENTION

The present invention relates to a method for checking an ultrasonic sensor of a motor vehicle as to whether the ultrasonic sensor is occluded by an object located on the motor vehicle, e.g., a layer of ice. The occlusion is ascertained as a function of a decay time, thus, the time for a natural oscillation of the diaphragm to die out after an excitation pulse has been applied to it for emitting an ultrasonic signal.

BACKGROUND INFORMATION

It is likewise known from published German patent application document 10 2010 021 960 A1 to measure the time duration of a post-pulse oscillation in order to detect a blocked state of an ultrasonic sensor. However, in the related art, the ultrasonic sensor is classified as blocked if the duration of the post-pulse oscillation exceeds a predetermined limiting value. It may then be assumed that ice or dirt is adhering to the diaphragm, because the inertia of the diaphragm is thereby increased. To check the plausibility of a detected blockage with the aid of the ultrasonic sensor, it is also known from the related art to additionally measure an echo of the excitation pulse, and from that, to ascertain a distance value. If this distance value does not change even in response to a movement of the motor vehicle of its own, then highly likely, it is a case of an object adhering to the diaphragm.

Instead of the decay period, it is known from published German patent application document DE 10 2009 040 992 A1 to measure the decay frequency. If the diaphragm is iced or dirt is clinging to it, then the flexural stiffness of the diaphragm changes, resulting in an altered decay frequency.

The detection of a snow-covered diaphragm based on the exceedance of a decay time period is also described in published German patent application document DE 101 42 075 A1. To check the plausibility of a detected occlusion, the outside temperature is also monitored.

The German Patent 101 64 760 B4 describes, upon parking a motor vehicle and shutting off the engine, thus, upon ending vehicle operation, to store the last distance value that was measured by an ultrasonic sensor with respect to an object extraneous to the vehicle. If the motor vehicle is then started again, thus, vehicle operation is commenced again, a distance value is measured once more. By comparing the distance values, it is determined whether snow or slush has gotten onto the diaphragm of the ultrasonic sensor while the motor vehicle was parked.

In connection with a radar sensor, it is known from published German patent application document DE 10 2007 026 033 A1 to measure a distance value of a motor vehicle to an object located by the radar sensor, and upon a movement of the motor vehicle of its own, to classify the radar sensor as iced if, in spite of the vehicle movement, the distance value does not change over several measuring cycles. However, the motor vehicle must move with a minimum speed for a reliable detection.

The published German patent application document 10 2005 057 973 A1 describes a functional test for an ultrasonic sensor of a motor vehicle, in which such a powerful ultrasonic signal is emitted that under usual conditions, this ultrasonic signal would have to be reflected by ground in front of the motor vehicle and received again. If only a highly attenuated echo or no echo at all is received from the ground, an occluded or defective ultrasonic sensor is assumed.

The distance values to foreign objects in the surroundings of the motor vehicle ascertained by ultrasonic sensors may be entered into a digital surrounding-field map to permit ascertainment of the relative positions of the foreign objects, taking into account self-movements of the motor vehicle, even if the foreign objects no longer lie in the sensing range of the sensors. To that end, for example, a maneuvering method for vehicles is known from published German patent application document DE 10 2007 030 769 A1. A digital surrounding-field map of this kind is also described in published international patent application document WO 2009/119577 A1.

The described decay time of the diaphragm of an ultrasonic sensor may be defined as follows: The decay time may begin with the pulsing by the excitation pulse and may end if the maximum amplitude of a period of oscillation of the natural oscillation is less than a predetermined limiting value.

For instance, a decay time of a free, unblocked diaphragm may lie in a range of 1000 μs to 1400 μs. On the other hand, a diaphragm encumbered with ice or dirt may have a decay time greater than 2000 μs. The detection of an occlusion of the diaphragm based on a prolonged decay time has proven to be problematic for the case when an echo of a foreign object strikes the ultrasonic sensor precisely when the amplitude of the natural oscillation drops below the amplitude threshold value mentioned. In that case, the ending of the natural oscillation is not recognized, but rather the natural oscillation together with the arriving echo is measured as prolonged decay. For this case, however, the ultrasonic sensor must not be classified as blocked or occluded, but rather, a warning signal must be output for an obstacle located close to the motor vehicle. Otherwise, the system is not safe.

A further problem with the measurement of the decay time is that the decay time only changes if dirt or ice adheres directly to the diaphragm itself, so that its dynamic behavior changes. However, in the case of especially thick dirt or ice crusts, it has turned out that these crusts do not co-oscillate with the diaphragm, but instead, the diaphragm detaches from the crust and oscillates freely under it with only a slightly altered decay time. Thus, even given a thick encrustation, the occlusion of the ultrasonic sensor cannot be detected on the basis of the decay time.

BRIEF SUMMARY OF THE INVENTION

The object of the present invention is to reliably detect an occlusion of an ultrasonic sensor of a motor vehicle.

With the aid of the method provided by the present invention, an ultrasonic sensor of a motor vehicle is checked for an occlusion, thus, an occlusion of its diaphragm by an object located on the motor vehicle itself and within the sensing range of the ultrasonic sensor, such as an ice layer or a layer of dirt, for example. The ultrasonic sensor checked is referred to hereinafter as first ultrasonic sensor.

A circuit referred to here as transmitter unit applies an excitation pulse to the diaphragm of the first ultrasonic sensor, so that the diaphragm thus emits an ultrasound into the sensing range. A circuit referred to here as evaluation unit then acquires a measuring signal of the first ultrasonic sensor, i.e., an electric signal derived from an oscillation of the diaphragm. The decay time of the natural oscillation of the diaphragm brought about by the excitation pulse is ascertained from the measuring signal. For example, the instant the excitation pulse is applied to the diaphragm may be defined as beginning. As end of the decay time, for instance, it may be determined that a maximum amplitude of oscillation of an oscillation period of the diaphragm is less than a predetermined threshold value.

In addition, from the measuring signal of the first ultrasonic sensor itself or from a measuring signal of a second ultrasonic sensor, an echo is determined that is produced by an object located in the sensing range of the first ultrasonic sensor, through reflection of the excitation pulse. Based on the echo, a distance value of the object is then determined. The distance value indicates the estimated distance of the object from the motor vehicle.

According to the method of the present invention, the evaluation unit now signals the occlusion of the first ultrasonic sensor for the case when the decay time is not greater, but rather is less than a predetermined threshold value. This is a quite specific threshold value. A threshold value is provided such that it would be exceeded if ice and/or dirt were to adhere directly to the diaphragm itself. Put another way, the occlusion is signaled precisely when, based on the decay time, it is detected that no ice and/or dirt is sticking to the diaphragm itself and, in other words, the diaphragm is thus exhibiting a normal or essentially normal decay time. For instance, the threshold value may lie in a range of 1800 μs to 2500 μs. In particular, it may amount to 2000 μs. Preferably, the threshold value is parameterizable, since the decay time of the sensor may be a function of its geometry, its diaphragm, the piezoelectric element used and further factors.

In this context, a further condition for signaling the occlusion, however, is that the distance value ascertained is less than a predetermined maximum value. In other words, the evaluation unit has been able to detect that an object is located close to the motor vehicle at a distance less than the predetermined maximum distance. For example, the maximum value may lie in a range of 0 cm to 50 cm, particularly in a range of 0 cm to 35 cm, preferably in a range of 0 cm to 15 cm. By preference, the maximum value is also parameterizable.

The method of the present invention has the advantage that it signals an occlusion of the first ultrasonic sensor which results owing to an ice layer or dirt layer adhering directly to the motor vehicle, during which it is possible for the diaphragm to oscillate freely. By verifying the decay time, which is less in comparison to the threshold value, it is ensured that the object detected is not exactly so far away from the motor vehicle that the echo overlaps with the end of the natural oscillation, which would certainly lead to an increased decay time, as described at the outset. Consequently, because of the normal decay time, it is thus clear that the object must be either further away or very much closer to the motor vehicle. By checking the distance value to the effect that it is less than the maximum value, it is then clear that the object must be located directly on the motor vehicle itself. Here, it is possible to reliably infer an object adhering to the motor vehicle or an object hanging down on it.

With the aid of the method according to the present invention, preferably the special situation is also brought about that the occlusion is likewise signaled if the motor vehicle is stationary during the ascertainment of the decay time and the distance value. To check the plausibility of the occlusion detection, conventional methods still always need the self-movement of the motor vehicle described at the outset, in order to check a change in distance to the object. In the present invention, a driver of the motor vehicle is now already able to be warned of it upon startup.

Naturally, a plausibility check based on a change in distance to the object is possible in the method of the present invention, as well. Accordingly, one example embodiment of the present invention provides for ascertaining at least one further distance value of the object, and determining a change in distance to the object on the basis of all distance values. The change in distance of the object is then compared to a travel distance of the motor vehicle which the motor vehicle covers due to its own movement. For example, the self-movement may be detected based upon an odometric reading. During a self-movement, the occlusion of the first ultrasonic sensor is only signaled if the change in the object distance is less than the distance traveled. In this context, the change in the object distance and the distance traveled do not have to be compared directly to each other. It is also sufficient to specify a threshold value both for the object distance measurement or the driving speed, with which then in each case the change in the object distance or the distance traveled or the driving speed is compared. Thus, for example, if the driving speed is greater than a first threshold value and the ascertained change in the object distance is less than a second threshold value, then this may likewise be used as a trigger for signaling the occlusion.

In another example embodiment of the present invention, at least one position of the object, ascertained from the distance value, is entered by the evaluation unit into a digital surrounding-field map provided in the motor vehicle, in which specific positions relative to the motor vehicle are stored with respect to obstacles or, in general, foreign objects that have been detected at least by the ultrasonic measurement and optionally, e.g., by radar measurement. In addition, the surrounding-field map is also updated on the basis of an odometrically ascertained movement of the motor vehicle of its own, that is, the foreign objects are shifted in the surrounding-field map corresponding to the self-movement of the motor vehicle. In considering the distance of the object described, not only is the individual distance value taken into account, but on the basis of the distance value itself and further positions entered into the surrounding-field map, which were determined with the aid of the first ultrasonic sensor and/or other sensors, it is ascertained with respect to the object whether the object is moving along uniformly together with the motor vehicle. During a self-movement of the motor vehicle, the occlusion is then only signaled in response to the detection of the uniform movement. The case that a dynamic object such as a foreign vehicle, for example, would coincidentally be moving along with the motor vehicle of the present invention at the small distance described, and thus would trigger a false alarm is so improbable that the signaling of the occlusion is justified in terms of safety. On the other hand, if the distance of the object changes, as revealed from the surrounding-field map with respect to the motor vehicle, then the occlusion is not signaled.

With regard to the use of a surrounding-field map, a further advantageous example embodiment is obtained when, for the case that the occlusion is signaled, the surrounding field of the motor vehicle is no longer monitored on the basis of the first ultrasonic sensor. It is obviously occluded and is no longer detecting foreign objects. Rather, in this example embodiment of the method, it is provided, within the sensing range of the first ultrasonic sensor, to measure distance to the foreign objects entered in the surrounding-field map and different from the co-moving object. Thus, if the first ultrasonic sensor is occluded by an ice layer, for example, then in light of map data of the surrounding-field map, the surrounding field of the motor vehicle beyond the ice layer, i.e., the blocked-out sensing range of the first ultrasonic sensor, is monitored on the basis of the surrounding-field map. The measuring signal of the occluded first ultrasonic sensor may be ignored. In other words, non-functioning sensors are selectively blocked out, and nevertheless, a rudimentary warning is carried out via the surrounding-field map. A partial availability of the ultrasonic system is thereby ensured. According to one advantageous further development, the occluded state of a sensor is indicated in the surrounding-field map and/or the defect area which currently cannot be monitored by the occluded sensor is preferably displayed differently than the areas able to be sensed with the aid of ultrasound. In particular, this display also takes place when known foreign objects are tracked into the defect area, so that the tracking of the foreign objects is recognized by the driver as a tracking based on old measurement data. This indicates the measuring uncertainty, since an object which was there 20 seconds ago, for example, does not necessarily still have to be there. This problem is displayed to the driver by the marking of the defect area as a kind of uncertain area. For instance, if the right front ultrasonic sensor in the motor vehicle becomes blocked, and if after a left-hand curve, an obstacle which previously was measured with the left ultrasonic sensor is in front of the right ultrasonic sensor, which certainly is not measuring, then the distance to the obstacle may continue to be ascertained on the basis of the surrounding-field model from the surrounding-field map, and the driver is able to be warned in response to a drop below a minimum distance.

In the case of the signaled occlusion during operation of the motor vehicle, preferably the occlusion is signaled acoustically to the driver only for a predetermined maximum time duration in the motor vehicle.

In this way, during vehicle operation, thus, between starting and switching off the driving engine, advantageously an acoustic warning tone is not output repeatedly, e.g., at each traffic-light stop, which would mean an unnecessary stress for the driver. In particular, the acoustic warning takes place only one time and/or for a total duration of 10 seconds at the most, preferably no more than 5 seconds.

According to another further refinement of the method of the present invention, in response to the signaled occlusion of the first ultrasonic sensor, it is decoupled from a proximity warning system of the motor vehicle. Erroneous activations of safety components such as an airbag, for instance, may thereby be prevented.

Preferably, the occlusion is signaled via a communications bus such as a CAN bus (CAN—Controller Area Network) or a FlexRay bus in the motor vehicle to one or more control devices. Consequently, the information about the occlusion is available to the control devices, which are then able to adapt their operating behavior to the state of the first ultrasonic sensor.

The transmitter unit described may be the circuit, known per se from the related art, for operating the diaphragm of an ultrasonic sensor. The evaluation unit may be a measuring circuit, known per se, for ascertaining the measuring signal as well as a processor which has a program module that is furnished to carry out the steps described for determining the variables relevant to the method. For example, the evaluation unit may include a microprocessor, microcontroller, or perhaps a control device of the motor vehicle. In particular, the indicated sensing range of an ultrasonic sensor is that range from which an echo of an obstacle is detected metrologically by the ultrasonic sensor itself or a different ultrasonic sensor, in the event a corresponding obstacle is present.

A distance-measuring apparatus for a vehicle also belongs to the present invention, by which an example embodiment of the method of the present invention is carried out.

To that end, the measuring apparatus has at least one ultrasonic sensor as well as a computing device for carrying out the method steps of the invention.

Finally, also belonging to the invention is a motor vehicle, having an example embodiment of the distance-measuring apparatus according to the present invention. The motor vehicle of the invention preferably takes the form of an automobile, especially a passenger car.

DETAILED DESCRIPTION OF THE INVENTION

In the exemplary embodiment explained in the following, the described components of the embodiment represent features of the invention that in each case are to be considered individually and independently of each other, and that in each instance likewise further refine the invention independently of each other, and therefore are also to be regarded individually or in a combination other than that indicated as component of the present invention. Moreover, the embodiment described may also be supplemented by further of the features of the invention already described.

Figure 1:
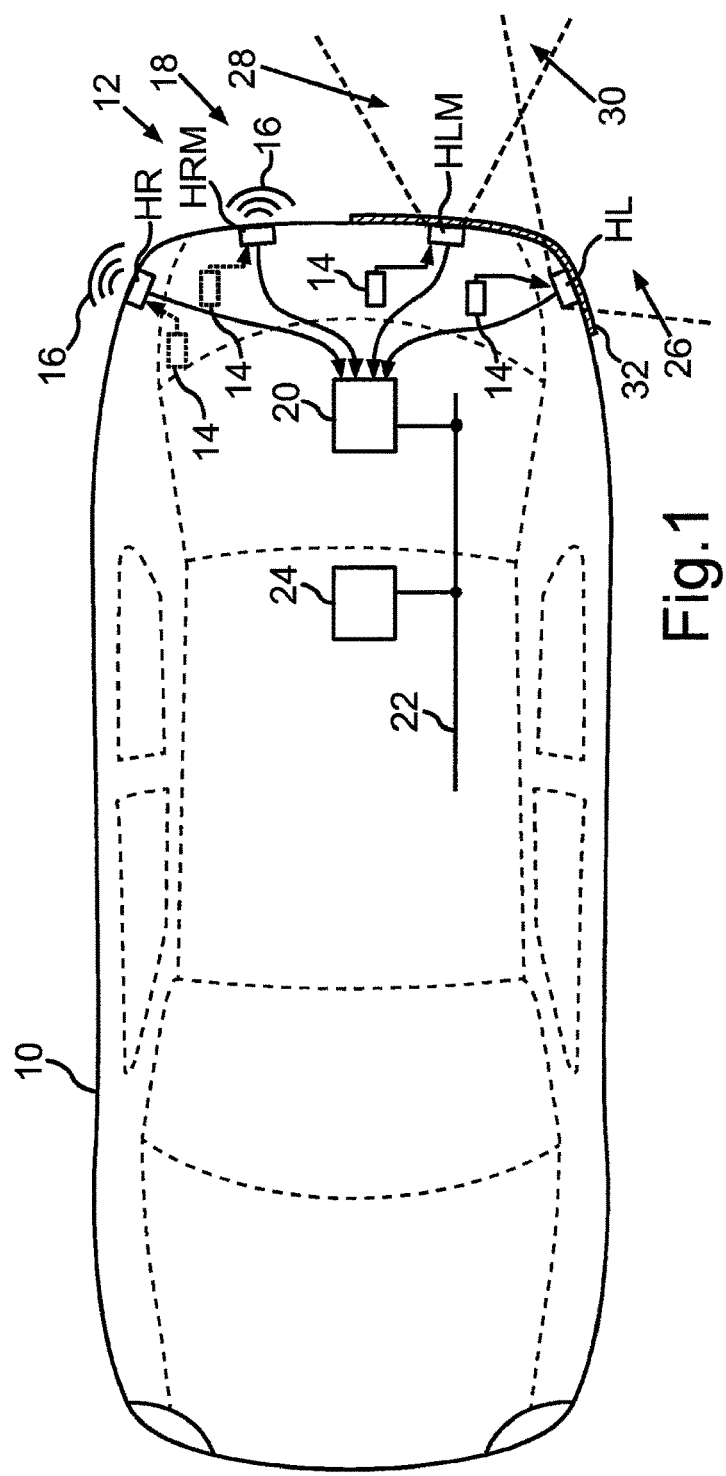
FIG. 1 shows a schematic representation of a specific embodiment of the motor vehicle according to the present invention.

FIG. 1 shows a motor vehicle 10 from a bird's-eye view; for instance, it may be an automobile, particularly a passenger car. In a tail end 12 of motor vehicle 10, e.g., in a bumper, ultrasonic sensors may be disposed that are denoted in FIG. 1 according to their placement as right rear "HR", right rear center "HRM", left rear center "HLM" and left rear "HL". Ultrasonic sensors HR, HRM, HLM, and HL may be part of a parking assist system. Each ultrasonic sensor may be formed in a manner known per se and have a diaphragm, to which a transmitter unit 14 is able to apply an excitation pulse in a manner known per se, so that the diaphragm radiates an ultrasound 16 into a close range 18 of motor vehicle 10. For the case when an obstacle or foreign object is within close range 18, ultrasound 16 is able to be reflected by the obstacle and fall back as echo onto the ultrasonic sensors. Electric measuring signals may then be generated from the echo in a manner known per se by an evaluation unit 20, e.g., with the aid of the diaphragms of the ultrasonic sensors. A single evaluation unit 20 is depicted in the example shown in FIG. 1. However, a separate evaluation unit may also be provided for each ultrasonic sensor.

Evaluation unit 20 may be coupled, for instance, via a vehicle communications bus 22, e.g., a CAN bus, to other control devices 24, so that a signal about the state of the ultrasonic sensors may be transmitted to the other control devices 24 via vehicle communications bus 22. Control devices 24 may then adapt their operating behavior to the state of the ultrasonic sensors. In the example shown in FIG. 1, a sensing range 26, 28 with respect to ultrasonic sensors HL, HLM is also identified, in which respective ultrasonic sensor HL, HLM is able to receive an echo reflected by an obstacle, if the obstacle is located in respective sensing range 26, 28. If the obstacle is in an overlap area 30 of sensing ranges 26, 28, then, for example, an ultrasound may also be emitted by ultrasonic sensor HL, and the echo from the obstacle may then be received both by ultrasonic sensor HL and ultrasonic sensor HLM and evaluated by evaluation unit 20.

In the example underlying FIG. 1, it is assumed that an ice layer 32 is on tail end 12 and is covering or occluding ultrasonic sensors HL and HLM. However, freedom of motion of the diaphragms of ultrasonic sensors HL, HLM is not impaired by ice layer 32 in the example. An ultrasound emitted by the diaphragm of ultrasonic sensor HL is reflected directly at ice layer 32, and returned again as echo of a pseudo-obstacle back to the diaphragm of ultrasonic sensor HL. It may also happen that the sound between tail end 12 and ice layer 32 along the tail end could reach the diaphragm of ultrasonic sensor HLM and likewise be perceived there as echo.

In the case of repeated measuring cycles, thus, if in each case an excitation pulse is provided to the diaphragms of the ultrasonic sensors and the echoes are ascertained with respect to this excitation pulse and from that a distance of possible obstacles in close range 18 is determined, then because of the echoes of the pseudo-obstacle caused by ice layer 32, an unvarying distance results for ultrasonic sensors HL and HLM, which is detected by evaluation unit 20. Upon movement of motor vehicle 10, evaluation unit 20 is able to infer from this that it is not a real, but rather simply a "phantom echo" of the pseudo-obstacle. Evaluation unit 20 therefore recognizes that ultrasonic sensors HL and HLM are covered by dirt or icing. This case may even be recognized independently of the consideration of the decay time of the sensors.

Algorithms known till now have considered only the decay time of the sensor diaphragms. However, tests on real vehicles in a cold environment have shown that an icing, like ice layer 32, may also appear without a substantial increase in the decay time, because the diaphragms themselves do not come in contact with the ice. Measured values for this are shown by way of example in FIG. 2. In each case, a distance value D1, D2, D3, D4 is shown in the unit cm for ultrasonic sensors HL, HLM, HRM, HR, as may have been determined illustratively by evaluation unit 20 for the situation shown in FIG. 1. Distance values D1 through D4 indicated represent sound paths, thus, the sum of the back and forth travel path of the ultrasound. Because of the measuring inaccuracy, a distance of, e.g., D1=D2=33 cm is determined for ultrasonic sensors HL, HLM covered by ice layer 32. A maximum distance value of, e.g., D3=D4=65535 is determined in each case for ultrasonic sensors HRM and HR, which stands for an obstacle-free sensing range of these ultrasonic sensors. Exemplary decay times may be obtained for ultrasonic sensor HL at T1=1168 μs, for ultrasonic sensor HLM at T2=1488 μs, for ultrasonic sensor HRM at T3=1184 μs and for ultrasonic sensor HR at T4=1232 μs. For the case when ice or dirt would cling directly to a diaphragm of one of the ultrasonic sensors, a decay time of greater than 2000 μs would result in the example shown.

The values indicated are only by way of example and correspond to a parameterization used for the measuring attempt. It is exactly the same for the distance values. The values indicated are derived from a measurement. In general, however, the distances for pseudo-obstacles because of ice/dirt are always in the close range. Preferably, the values described are parameterizable, since the decay time of each sensor may be a function of its geometry, its diaphragm, the piezoelectric element and even more factors.

Figure 2:
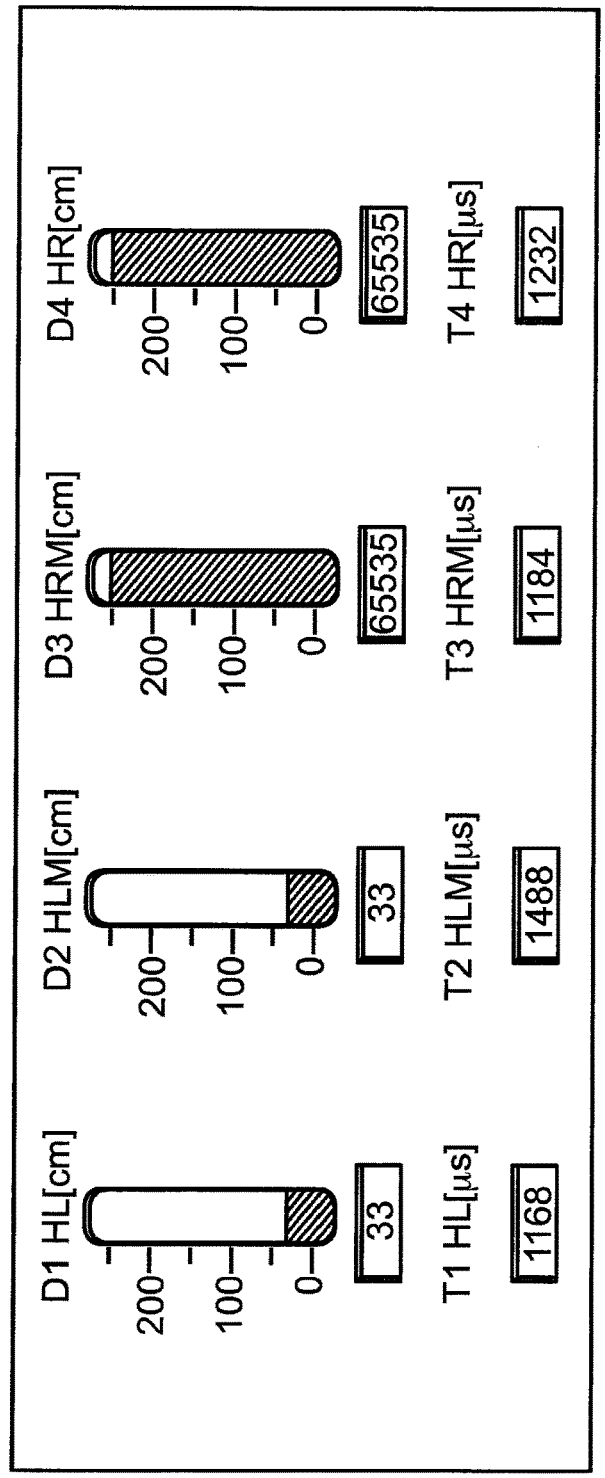
FIGS. 2 to 4 show measured values which were ascertained in the motor vehicle of FIG. 1.

In light of the measurement values shown in FIG. 2, evaluation unit 20 recognizes that ultrasonic sensors HL, HLM are indicating a distance value that is less than a predetermined threshold value. For example, the threshold value may lie in a range of 33 to 50 cm. At the same time, it is determined by evaluation unit 20 that neither decay time T1 nor decay time T2 is greater than 2000 μs, which in the example, represents the threshold value for the detection of ice or dirt adhering to the diaphragms.

Therefore, evaluation unit 20 signals, for instance, via vehicle communications bus 22, e.g., to control devices 24, that distance values D1, D2 of ultrasonic sensors HL, HLM do not represent distances to real obstacles in sensing ranges 26, 28, but rather are caused by echoes from an object, thus here ice layer 32, adhering to motor vehicle 10. Consequently, distance values D1, D2 of ultrasonic sensors HL, HLM are not taken into account in the monitoring of a surrounding field, as may be carried out, for example, by one of control devices 24, e.g., during parking of motor vehicle 10 in a parking space.

The situation shown in FIG. 2 (icing of a sensor without adversely affecting the decay time but with "pseudo-obstacle" at approximately <=30 cm) in essence represents the innovation. Real obstacles located very close to the sensor almost always adversely affect the decay time (increased decay time). If the latter is not the case and the "pseudo-obstacle" persists even upon movement of the vehicle, in all probability it is nevertheless also an icing/dirt accumulation on the sensor. If, moreover, no indirect echoes exist between both sensors (here: HL and HLM), the likelihood of ice/dirt increases once again.

Figure 3:
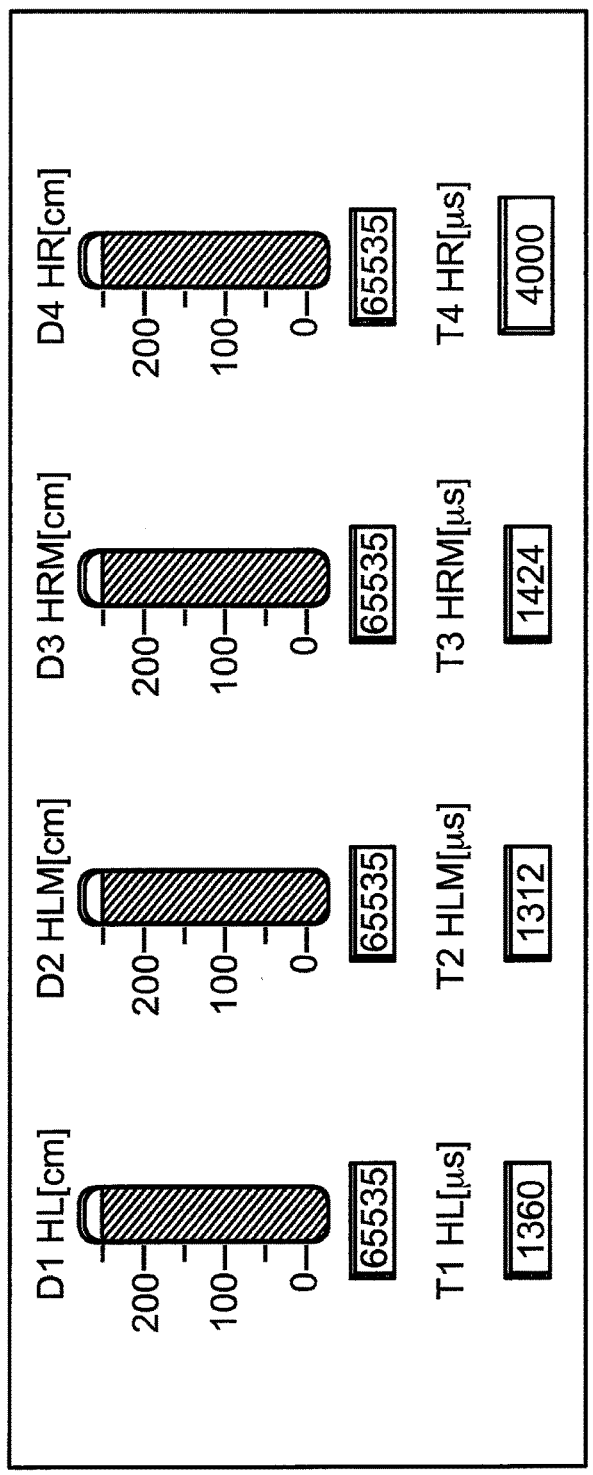

FIG. 3 shows a measuring result for the distance measurement which was produced in a situation different from the situation shown in FIG. 1. At the instant of the measurement, there was no obstacle in close range 18. Ultrasonic sensor HR had an ice layer on its diaphragm. On the other hand, the remaining ultrasonic sensors were free, that is, unblocked. Distance measures D1, D2, D3, D4 indicate that no obstacle was detected. Decay times T1, T2, T3 point toward unencumbered diaphragms. Decay time T4 amounts to 4000 μs, for example, and is therefore greater than threshold value 2000 μs effective in the example, which is exceeded if ice is on a diaphragm of an ultrasonic sensor. Thus, it may be recognized from the measured values shown in FIG. 3 that ultrasonic sensor HR must be switched off, because ice was detected on its diaphragm. This may also be detected during standstill of a motor vehicle.

Figure 4:
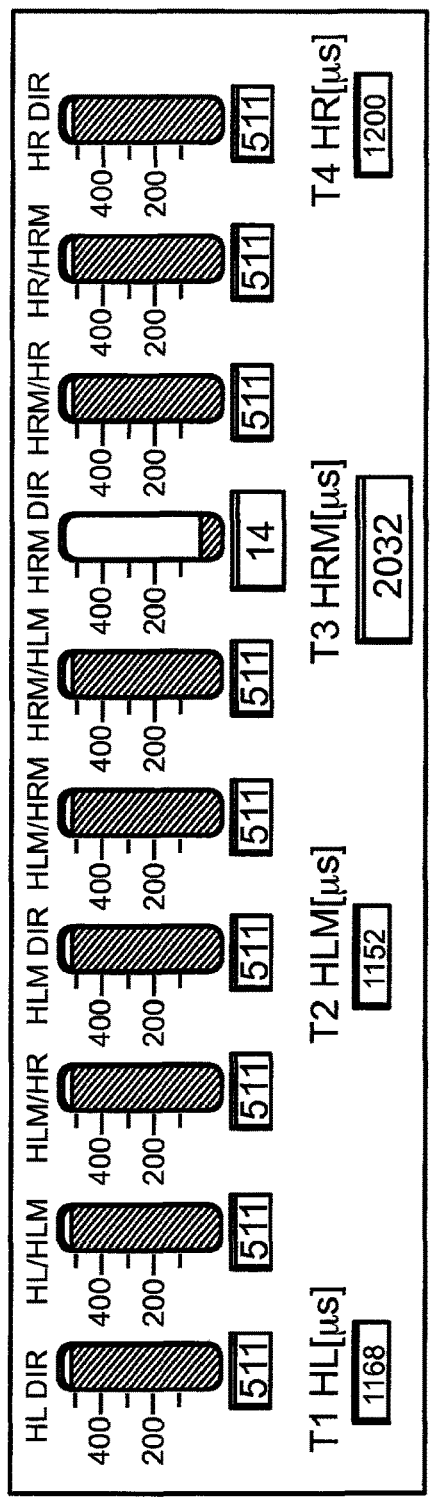

FIG. 4 shows the measuring result for a further situation. FIG. 4 additionally illustrates how not only is a distance able to be measured in each case by a single ultrasonic sensor, but rather, for instance, an ultrasound emitted by ultrasonic sensor HL, if reflected, may also be received by adjacent ultrasonic sensor HLM. In FIG. 4, this measurement is identified as HL/HLM. Similarly, ultrasound radiated conversely by ultrasonic sensor HLM may be received as echo by ultrasonic sensor HL, which yields the measurement HLM/HL. The remaining measurements shown in FIG. 4 have corresponding designations source/receiver. The abbreviation DIR indicates the case where source=receiver. FIG. 4 shows a situation in which an object, e.g., a leaf of a plant, is located at a distance in the range of, for example, 10 cm to 15 cm in front of ultrasonic sensor HRM. No further obstacles are in close range 18. The measured values shown in FIG. 4 are scaled differently than those in FIG. 2 and FIG. 3. In the example in FIG. 4, value 511 is the maximum possible measured value, which points to a clear sensing range of the respective ultrasonic sensor. Correspondingly, the indication with respect to distance measures D1, D2, D4 is that no obstruction is in the sensing range. The cross measurements also give no indication of an obstacle. Ultrasonic sensor HRM indicates an obstacle at a distance, which here yields the distance value D3=14. In the case of this distance, the natural oscillation of the diaphragm of ultrasonic sensor HRM overlaps with the echo of the obstacle. The natural oscillation and the echo overlap at the diaphragm, which leads to an exemplary value T=2032 μs in the measurement of the decay time. Thus, although decay time T3 is greater than threshold value 2000 μs effective here, as may result in the case of an iced diaphragm, ultrasonic sensor HRM cannot be switched off here on the basis of the value D3=14. It must be assumed that there is an obstacle in front of ultrasonic sensor HRM. For example, a sensor may first be switched off at a velocity v≥10 km/h of motor vehicle 10. Accordingly, the continuous warning tone does not cease until then either, and the visual indicator for the obstacle stops blinking. As soon as motor vehicle 10 becomes slower again, v<10 km/h, the warning tone and the blinking signal appear again owing to renewed activation of the parking system.

The measuring situation as illustrated by way of example in FIG. 4, that is, a distance measurement that indicates a close obstacle (0 cm to 30 cm), and in this context, an increased decay time being measured, thus, a decay time that points to an iced diaphragm, is not indicated in the related art as the situation "ice detected." For the case when there is actually no foreign object in front of the ultrasonic sensor, thus, in the example of FIG. 4, in front of ultrasonic sensor HRM, but rather, for example, a loose object is hanging down on the vehicle like, for instance, a cover or a tarp which is sticking out of the trunk, then the driver will always hear the continuous tone as error signal whenever the motor vehicle drops below the threshold speed, e.g., 10 km/h. In particular, the warning will thus sound again and again in response to this automatic switch-in of a parking-assist system. This warning brings no additional benefit and is annoying for the driver. The actual information would be the indication that there is obviously an interference with the ultrasonic sensor, thus here by a dangly object, and this ultrasonic sensor is deactivated for the parking-assist system. As a rule, however, for lack of identification, there is no differentiation as to whether an ultrasonic sensor is blocked or whether a close obstacle is in front of the ultrasonic sensor. Both lead to a persistent warning with a continuous tone. From the functional aspect, this is the safest state. Owing to the continuous tone, the driver recognizes a failure of the system. This pattern still dates from the time when parking-assist systems had no display and output a warning in purely acoustic fashion. In the case of motor vehicle 10, however, a visual display may also be made available that, for example, visualizes measured values D1, D2, D3, D4.

To now prevent the generating of a continuous tone in the case of the situation according to FIG. 4 as well, and, for example, to likewise check the plausibility of the measurement according to FIG. 2, it may be provided to include the driving speed and the period of time for which an obstacle was detected in the consideration as well. For example, already above the critical threshold value for switching off the ultrasonic sensors, thus here 10 km/h, the ultrasonic sensors may be switched to an eavesdropping mode. For instance, this may be started at a driving speed below a threshold speed of, e.g., 15 km/h. Obstacles are measured and in the event a minimum distance is not attained, it may initially be checked whether a plausible obstacle is present at all. A measurement of a distance less than a predetermined minimum distance or a constant distance over a longer time during the drive are implausible. For example, if motor vehicle 10 is traveling at 3.6 km/h, it is covering 1 m per second. The smallest distance measured by the ultrasonic sensors may be 20 to 30 cm, for instance. An iced sensor generates a measuring signal that indicates an obstacle at this distance. Thus, if this distance has already been exceeded because the vehicle has been rolling for one second, for example, and the same distance to an obstacle is still indicated by an ultrasonic sensor, it must be an error detection, e.g., due to icing, or it must be a co-moving obstacle. From this analysis, one may infer that the sensor is not operating correctly. In this case, the ultrasonic sensor is deactivated, that is, its sensing range is no longer monitored based on the measuring signals of the ultrasonic sensor itself. A corresponding fault may be signaled to the driver. Since such a fault is now distinguishable from an actual close obstacle, which specifically is not co-executing the self-movement of motor vehicle 10, a persistent warning is no longer necessary. Upon each activation of the parking-assist system or upon switching off the indicator in the motor vehicle, a fault may be signaled one time for the driver and the acoustic warning may then be switched off. A visual display of the fault may remain.

Additionally or alternatively, a surrounding-field model, i.e., a digital surrounding-field map may also be used. In considering the measured values of an ultrasonic sensor, no longer is just the individual measured value considered, thus, an individual distance value, but rather all distance values of all sensors stored over time in a surrounding-field map.

This surrounding-field map is moved along together with the vehicle movement, e.g., using an odometric calculation. Detection of an incorrectly operating ultrasonic sensor, e.g., due to blockage, is possible according to the same method as described. In addition, owing to the odometric calculation, it is possible to determine exactly which area for the motor vehicle was measured, and which not. A partial availability of the parking-assist system may thereby be ensured. For instance, a right front ultrasonic sensor (not shown in FIG. 1) may be blocked. An obstacle that was measured by an ultrasonic sensor on the left side of the motor vehicle, after a left-hand curve, is in front of the right ultrasonic sensor, which, however, does not detect this obstacle. In light of the surrounding-field map, however, this object may continue to be tracked and the driver warned accordingly if the object is too close to motor vehicle 10.

Overall, therefore, the present invention provides an improvement in detecting ice in the case of a parking-assist system, as well as detection of blocked sensors based on a surrounding-field model.

What is claimed is:

1. A method for checking a first ultrasonic sensor of a motor vehicle for an occlusion, the method comprising:
   applying, by a transmitter unit, an excitation pulse to a diaphragm of the first ultrasonic sensor;
   detecting, by an evaluation unit, a measuring signal of the first ultrasonic sensor, and ascertaining from the measuring signal a decay time of a natural oscillation of the diaphragm, brought about by the excitation pulse;

ascertaining, from one of the measuring signal of the first ultrasonic sensor or a measuring signal of a second ultrasonic sensor, an echo of the excitation pulse, produced by an object located in a sensing range of the first ultrasonic sensor, and determining at least a first distance value of the object on the basis of the echo; and signaling, by the evaluation unit, an existence of the occlusion at least if (i) the decay time is less than a predetermined threshold value, and (ii) the first distance value is less than a predetermined maximum value, wherein the predetermined threshold value represents a value which is exceeded in the event at least one of ice and dirt is adhered directly to the diaphragm.

2. The method as recited in claim 1, wherein the occlusion is also signaled if the motor vehicle is stationary during the ascertainment of the decay time and the at least first distance value.

3. The method as recited in claim 1, wherein at least one second distance value of the object is ascertained, and a change in distance to the object is determined on the basis of the first and second distance values, and a distance traveled by the motor vehicle is determined on the basis of a movement of the motor vehicle, and during the movement of the motor vehicle, the occlusion is only signaled if the change in the distance to the object is less than the distance traveled by the motor vehicle.

4. The method as recited in claim 1, wherein:
based on the at least first distance value, the evaluation unit enters a position of the object into a digital surrounding-field map made available in the motor vehicle;
respective positions, ascertained relative to the motor vehicle, of foreign objects detected at least by ultrasonic measurement are stored in the digital surrounding-field map;
the surrounding-field map is updated on the basis of an odometrically determined movement of the motor vehicle;
ascertaining whether the object is moving along together with the motor vehicle, based on the distance value and positions of the object entered in the surrounding-field map; and
the existence of the occlusion is signaled only if the object is moving along together with the motor vehicle.

5. The method as recited in claim 4, wherein for the case that the existence of the occlusion is signaled, then in the sensing range of the first ultrasonic sensor independently of the measuring signal of the first ultrasonic sensor, and on the basis of map data of the surrounding-field map, distance is measured to at least one additional foreign object which is entered in the surrounding-field map and different from the object for which the first distance value was determined.

6. The method as recited in claim 1, wherein during operation of the motor vehicle, the occlusion is signaled acoustically only for a predetermined maximum period of time.

7. The method as recited in claim 1, wherein, in response to the signaling of the occlusion, the first ultrasonic sensor is decoupled from a proximity warning system of the motor vehicle.

8. The method as recited in claim 1, wherein the occlusion is signaled via a communications bus in the motor vehicle.

9. A distance-measuring apparatus for a motor vehicle, comprising:
at least one ultrasonic sensor; and
a controller including a processor configured to perform the following:
apply, by a transmitter unit, an excitation pulse to a diaphragm of the first ultrasonic sensor;
detect, by an evaluation unit, a measuring signal of the first ultrasonic sensor, and ascertain from the measuring signal a decay time of a natural oscillation of the diaphragm, brought about by the excitation pulse;
ascertain, from one of the measuring signal of the first ultrasonic sensor or a measuring signal of a second ultrasonic sensor, an echo of the excitation pulse, produced by an object located in a sensing range of the first ultrasonic sensor, and determine at least a first distance value of the object on the basis of the echo; and
signal, by the evaluation unit, an existence of the occlusion at least if (i) the decay time is less than a predetermined threshold value, and (ii) the first distance value is less than a predetermined maximum value, wherein the predetermined threshold value represents a value which is exceeded in the event at least one of ice and dirt is adhered directly to the diaphragm.

* * * * *